Oct. 19, 1937.  J. SNEED  2,096,622

BRAKE MECHANISM

Original Filed Dec. 2, 1925  3 Sheets-Sheet 1

JOHN SNEED, Inventor

JOHN SNEED, Inventor

Oct. 19, 1937. J. SNEED 2,096,622
BRAKE-MECHANISM
Original Filed Dec. 2, 1925 3 Sheets-Sheet 3
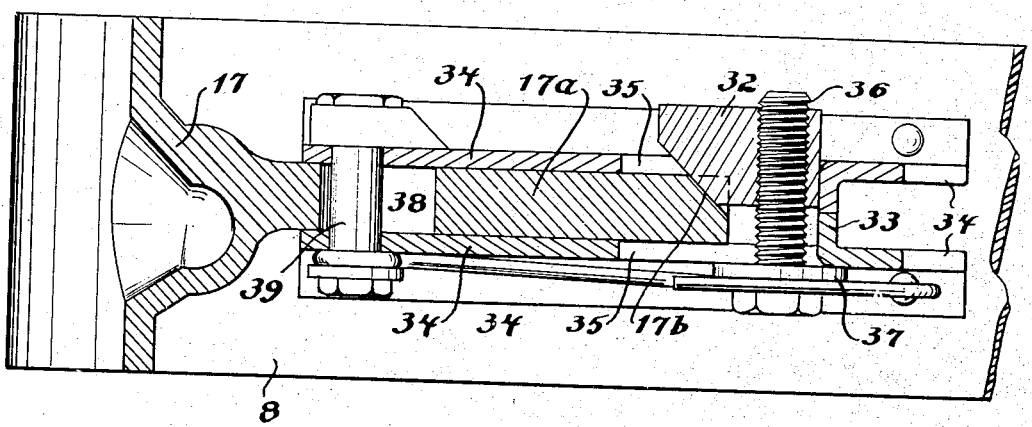
FIG.—5
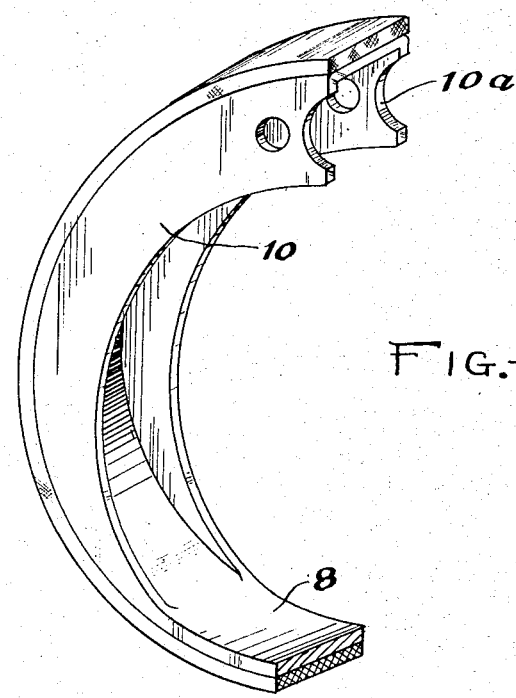
FIG.—3
John Sneed Inventor Patented Oct. 19, 1937

2,096,622

UNITED STATES PATENT OFFICE 2,096,622

BRAKE MECHANISM

John Sneed, Grosse Pointe Shores, Mich., assignor to The Midland Steel Products Company, Cleveland, Ohio, a corporation of Ohio, as trustee for Steeldraulic Brake Corporation, a corporation of Michigan Original application December 2, 1925, Serial No. 72,670. Divided and this application August 21, 1933, Serial No. 686,106. In Great Britain February 6, 1928

4 Claims. (Cl. 188—78)

This invention relates to improvements in brake shoes or bands and this application is a division of my copending application Serial No. 72,670 filed December 2, 1925.

An important object of the invention is to provide a brake shoe having portions with different degrees of flexibility and rigidity and which portions may possess different ratios to obtain various results.

Other objects and advantages will become apparent during the course of the following description.

In the drawings:

Fig. 3 is a perspective view of the more rigid end of the shoe.

Fig. 5 is an enlarged detail view of the adjuster at one end of the shoe.

Figure 1:
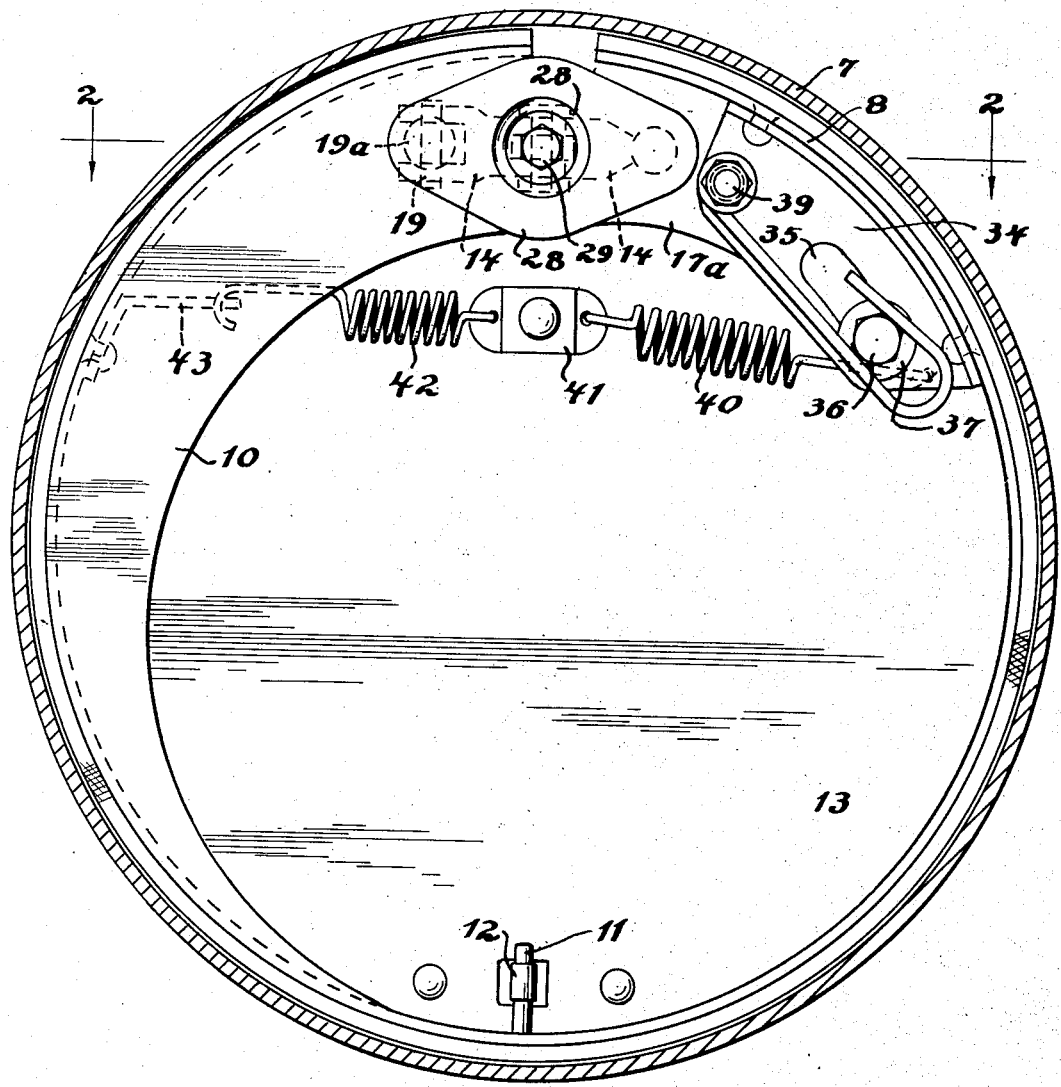
Fig. 1 is a vertical sectional view through one of the brakes, with the brake shoe in normal release position.
Figure 2:
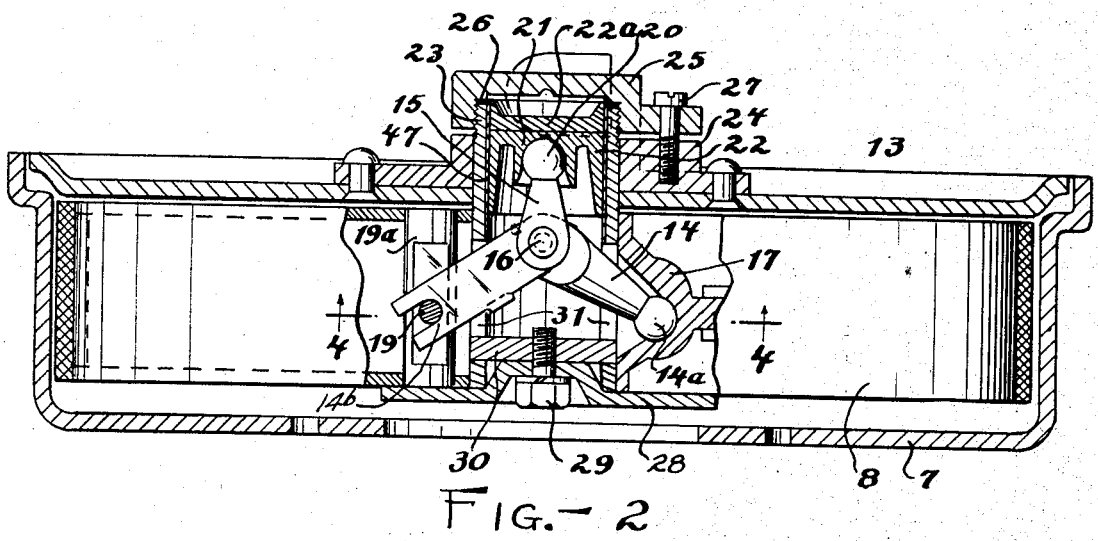
Fig. 2 is a horizontal sectional view taken substantially on the line 2—2 of Fig. 1.

A brake drum 7 houses a full floating brake shoe 8. This shoe is preferably formed of a one piece divided annulus having a portion substantially flexible and the remaining portion of the brake shoe stiffened by a pair of ribs 10 so as to render it substantially rigid. This shoe or band is preferably formed from stock of channel shape cross section; the more flexible part having the flanges or ribs 10 preferably entirely removed therefrom by cutting away the same from a point adjacent one end to a point where the ribs 10 begin adjacent the central portion of the band. These ribs 10 forming the rigid side of the shoe or band gradually increase in depth from a point adjacent the middle of the band to one free end as illustrated in Fig. 1. The relative extents of the flexible and rigid portions of the band may be varied as desired, but preferably the rigid portion does not exceed one-half of the circumference of the brake shoe. The purpose of the flexible portion is to enable the gradual application of the brake shoe to the brake drum with increasing force, the movement of the brake actuating mechanism first forcing the adjacent extremity of the flexible portion against the brake drum, and then the turning movement of the brake drum is utilized to multiply the gripping action of the flexible portion of the brake shoe and transmit this increased power to the extremity of the rigid portion of the brake shoe opposite that engaged by the brake actuating mechanism. The result is that when the brakes are first set only a relatively small portion of the brake surface is thrown into contact with the brake drum, and such braking surface is gradually increased by the rotation of the brake drum until the entire rigid portion of the brake shoe is moved substantially as a unit into engagement with the brake drum. By varying the relative extents of the flexible and rigid portions of the brake shoe, different graduations of the pressure applications can be secured. A pin 11 extends radially inward from the brake shoe at substantially its lowermost portion, and a leaf spring 12 has one extremity encircling the radial pin 11 and its opposite extremity secured to the face plate 13 substantially covering the brake mechanism at the open side of the brake drum 7, so that the leaf spring may cushion and limit the movement of the brake shoe relatively to the brake drum. Such a brake shoe, as well as one form of brake actuating mechanism for operating same has been described in my companion application, Serial No. 2,715, filed January 16, 1925, and is illustrated herein to exemplify the best use now known for the brake actuating mechanism forming the claimed disclosure herein. Each brake shoe 8 is adapted to be extended outwardly into engagement with the brake drum 7 upon the movement toward straight line position of a pair of toggle levers 14 arranged with their free extremities engaging the respective ends of the brake shoes and their other extremities pivoted to each other and to the yoke 15 by means of the pivot pin 16. As herein shown one toggle lever 14 is formed with a substantially spherical shaped head 14ª on its free extremity seating in a cup shaped fulcrum block 17 mounted upon one extremity of the brake shoe, while the free extremity of the other toggle lever is preferably bifurcated, as at 14ᵇ, and provided with slots 18 at the extremities of the furcations in which is received the fulcrum pin 19 mounted in a cross bar 19ª carried by the side ribs 10 of the opposite extremity of the brake shoe. By virtue of this arrangement the free extremities of the toggle levers seat upon the opposite extremities of the brake shoe so as to exert pressure thereagainst regardless of the relative positions of the toggle levers, the spherical head 14ª and the slotted bifurcations 14ᵇ pivoting upon the fulcrum seat 17 and fulcrum pin 19 respectively during the movements of the toggle levers. The yoke 15 may also be provided with a spherical head 20 adapted to seat within a cup 21 carried by the piston 22, which piston is fitted within the cylinder 23 so as to slide within the cylinder under the impulse of the hydraulic actuating mechanism, as hereinafter described. The cylinder 23 also serves as an anchor pin for limiting the contractile movements of the brake shoe away from the brake drum. As shown the cylinder 23 extends through an aperture in the face plate 13 and is secured in a bracket 24 riveted upon the face plate, as shown in Figs. 2 and 3, the inner extremity of the cylinder projecting inwardly of the bracket 24 and being threaded to receive the cylinder head 25. The cylinder head may be threaded upon the cylinder for a sufficient distance to compress a suitable packing 26 and may be then firmly locked in position by the set screw 27 extending through an ear on the piston head and threading into the bracket 24. The longer axis of the cylinder 23 extends at right angles to the direction of movement of the free ends of the brake shoe and also at right angles to the toggle levers utilized to transmit power from the piston 22 to the brake shoe, the outer extremity of the cylinder projecting across the brake drum between the free portion of the brake shoe and carrying at its outer extremity a brake shoe limiting member 28. As best shown in Fig. 2 the limiting member 28 is secured, as by the set screw 29, to a cross bar 30 arranged within a pair of elongated slots 31 in the outer portion of the cylinder. The toggle levers 14 are adapted to extend through the slots 31, substantially as shown, while the extremities of the brake shoe normally engage the cylinder adjacent the extremities of the slots 31. As can best be seen in Figures 2 and 3, the set screw 29 also acts as a limiting member, serving to control the extent of travel of the toggle levers 14 regardless of the pressure applied thereto, thereby preventing accidental movement of the toggle levers beyond a straight line position.

Means may be provided for permitting the adjustment of the effective length of the brake shoe. In the illustrated embodiment I have shown a simple and effective means of adjusting the position of the seat 17 upon the brake shoe 8, and accordingly, adjusting the initial position of the brake shoe relatively to the brake drum 7. The cup-shaped seat 17 is formed with a curved shank 17ᵃ (note Fig. 5) having its rear extremity beveled, as at 17ᵇ, for engagement with the wedge 32 arranged with its inclined face in engagement with the beveled portion 17ᵇ and its opposite extremity contacting the web 33 connecting the rear extremities of the spaced lugs 34 extending radially inward from the brake shoe. A pair of aligned slots 35 are arranged in the lugs 34 for the passage of the wedge 32 and an adjusting screw 36 is threaded into the wedge and having its head extending laterally beyond the lugs 34 for convenient turning by a wrench or other suitable tool. A washer 37 is preferably interposed between the head of the bolt 36 and the adjacent lug 34, the washer being of greater diameter than the width of the slot 35. The shank 17ᵃ of the cup-shaped seat 17 is also slotted as at 38, to permit the passage of a bolt 39 extending through the lugs 34 adjacent their upper extremities and serving to brace the lugs 34 while permitting longitudinal movement of the cup-shaped seat. When the adjusting screw 36 is turned in the proper direction, the wedge 32 will be drawn laterally across the web 33, and in so doing will tend to slide the shank 17ᵃ and seat 17 toward the anchor pin 23, but since the seat 17 firmly contacts the anchor pin so as to resist movement in this direction the resultant action will be the movement of the web 33 and the brake shoe outwardly toward the brake drum 7, thereby adjusting the initial position of the brake shoe relatively to the brake drum against the tension of the coil spring 40 arranged between one of the webs 34 and a lug 41 fixed upon the face plate 13, substantially as shown in Fig. 1. Of course when the adjusting nut 36 is turned in the opposite direction the extremity of the brake shoe 8 will be moved inwardly away from the brake drum through the medium of the coil spring 40, which takes up any space between the inclined surface of the wedge 32 and the beveled face 17ᵇ of the shank. A coil spring 42 is also preferably arranged between the lug 41 and a lug 43 carried by the opposite extremity of the brake shoe to normally maintain that extremity of the brake shoe in contact with the anchor pin 23.

The piston 22 is adapted to be reciprocated within the cylinder 23 by the force exerted through the hydraulic actuating mechanism or the power of the springs 40 and 42 respectively. Thus, when a liquid under pressure is forced into the inner extremity of the cylinder 23, the piston is moved outwardly, and in such movement forces apart the extremities of the brake shoe against the tension of the springs 40 and 42. Then when the pressure on the liquid is released, these springs pull the extremities of the brake shoe back to their original positions, and in so doing force the toggle levers 14 to slide the piston 22 inwardly to expel the liquid then within the cylinder 23. Any suitable means may be employed for transmitting the hydraulic pressure to the several cylinders 23. A number of operative constructions are on the market for forcing liquid under pressure from a central reservoir to the brakes of the several wheels of an automobile, and, since my invention does not reside in this portion of the brake actuating mechanism, no attempt has been made to illustrate any particular means of producing the necessary hydraulic power.

Figure 4:
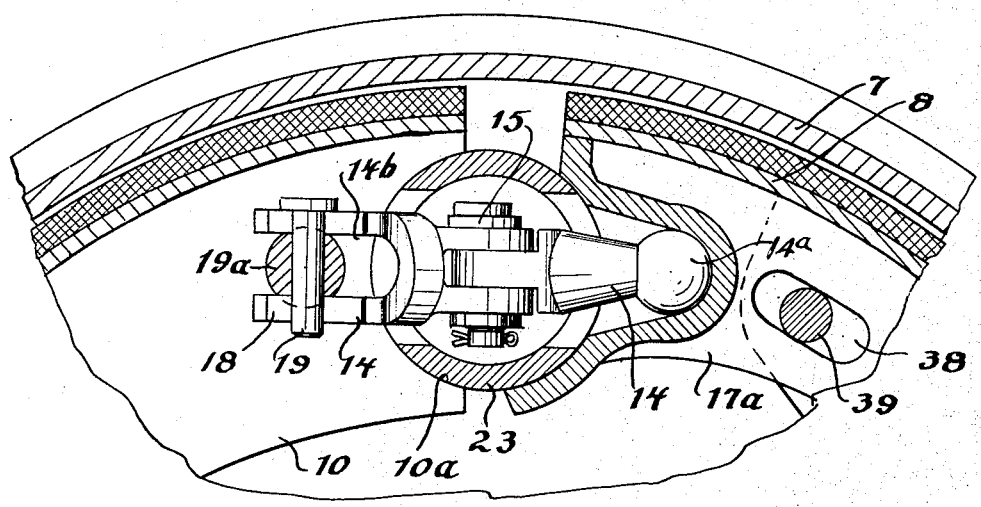
Fig. 4 is an enlarged detail view taken substantially on the line 4—4 of Fig. 2.

As shown in Fig. 3, the ends of the ribs 16 at the free end of the band are cut into arcuate bearing surfaces 16ᵃ to anchor against the cylinder wall as illustrated in Fig. 2. The end of the seat 17 is also finished to anchor against the cylinder wall as shown in Fig. 4.

The interior of each cylinder 23 may be machined to co-operate with its piston 22, and a packing cup 22ᵃ fixed upon the head of the piston to prevent the leakage past the piston of the actuating fluid within the cylinder. Or I may provide a separate lining 47 of suitable wear and corrosion resisting material, and arrange such lining within the inner portion of the cylinders 23 substantially as shown in Fig. 2. The inner wall of the liner should be machined to snugly receive its piston 22 and a similar packing cup 22ᵃ, or rubber or other suitable material should so fit within the liner as to prevent leakage of the hydraulic fluid past the piston. It will be apparent that this construction is well adapted to continued operation of the brakes and economic assembly and servicing. Thus if the liner 47 should become scored or otherwise incapacitated for further service, or should the packing cup 22ᵃ or other portion of the piston become incapacitated, it is possible with my construction to quickly remove the defective portions and substitute new ones without requiring the removal of the wheel from the vehicle. By removing the cylinder head 25 from the inner extremity of the cylinder 23, access may be had to the interior of the cylinder, and the liner 47 or the packing cup 22ª may be readily withdrawn and another substituted from the inner side of the brake.

It is also easy to service the remaining portions of my brake mechanism from the outer side of the brake. When the wheel and drum are removed access is given to the adjusting bolt 36, and such other parts of the apparatus as are liable to wear.

It will be noted that the arrangement of the piston and toggle lever is such that the proper extremity of the brake shoe will be forced into engagement with the brake drum regardless of the direction of rotation of the brake drum. The thrust imparted to the toggle levers will be transmitted in greater degree to that extremity of the brake shoe that is free to move with the brake drum, since the toggle levers will fulcrum on either the seat 17 or the fulcrum pin 19 when one extremity of the brake shoe is offering resistance to a greater degree than the other extremity of the brake shoe and further thrust imparted by the piston will be taken up entirely by the extremity of the brake shoe then free to move. Moreover, I preferably arrange the cross bar 19ª carrying the fulcrum pin 19 so that it may pivot within the sides of the brake band 8, with the result that a universal joint effect is secured at this extremity of the brake shoe, the cross bar 19ª rotating to accommodate movements in a vertical direction while the adjacent toggle lever may turn upon the fulcrum pin 19 to accommodate movements in a horizontal direction. The ball and socket arrangement in the opposite extremity of the brake shoe will, of course, also provide for universal movement.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

I claim:

1. The combination with a brake shoe formed in U-shaped channel section at one end thereof, means for forcing the shoe away from said anchor, a pin rotatably mounted in laterally aligned openings in the sides of the U-shaped section and near the end of the shoe, said pin and said means being connected in pivotal relationship about an axis transverse to the axis of the pin whereby a universal movement is effected between said means and the shoe.

2. The combination of a brake shoe partly channeled in cross section and anchorable at either end and being of progressively increasing flexibility from substantially one end through approximately 180°, anchoring means, the flanges of the channel section being engageable with said anchoring means and a member adjustably secured to the other end of the brake shoe and engageable with said anchoring means, and means for changing the circumferential relation of said last named member with the shoe.

3. A floating brake shoe having a channel section at one end and extending as a generally cylindrical lining supporting part to the other end, a pair of inwardly flanged members secured to the last mentioned end of the shoe and spaced from each other laterally of the shoe, and an anchor engaging member adjustably secured between said flanged members.

4. A brake shoe being channeled in cross section at one end, the ends of the flanges of the channels being formed to provide anchor bearing surfaces for that end of the shoe, the remainder of the shoe comprising a hoop like portion formed in a unit with the channel portion, and means engageable with an anchor adjustably secured to the free end of the said hoop-like portion of the shoe.

JOHN SNEED.